(12) United States Patent
Boissière et al.

(10) Patent No.: US 11,308,686 B1
(45) Date of Patent: Apr. 19, 2022

(54) CAPTURED IMAGE DATA IN A COMPUTER-GENERATED REALITY ENVIRONMENT

(71) Applicant: Apple Inc., Cupertino, CA (US)

(72) Inventors: Clément Pierre Nicolas Boissière, San Francisco, CA (US); Samuel Lee Iglesias, Palo Alto, CA (US); Edwin Iskandar, San Jose, CA (US); Timothy R. Oriol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/100,685

(22) Filed: Nov. 20, 2020

Related U.S. Application Data

(63) Continuation of application No. 16/141,393, filed on Sep. 25, 2018, now abandoned.

(60) Provisional application No. 62/566,221, filed on Sep. 29, 2017.

(51) Int. Cl.
| | |
|---|---|
| *G06F 3/01* | (2006.01) |
| *G06T 15/20* | (2011.01) |
| *G06T 19/00* | (2011.01) |
| *G06T 13/40* | (2011.01) |

(52) U.S. Cl.
CPC ............ *G06T 15/20* (2013.01); *G06F 3/012* (2013.01); *G06T 19/006* (2013.01); *G06F 3/017* (2013.01); *G06T 13/40* (2013.01)

(58) Field of Classification Search
CPC ....... G06T 15/20; G06T 19/006; G06T 13/40; G06F 3/012; G06F 3/017
See application file for complete search history.

(56) References Cited

U.S. PATENT DOCUMENTS

| | | | |
|---|---|---|---|
| 8,177,611 B2 | 5/2012 | Kang | |
| 8,523,677 B2 | 9/2013 | Baldwin, III et al. | |
| 9,041,743 B2 * | 5/2015 | McArdle | G06T 15/20 |
| | | | 345/660 |
| 2016/0093108 A1 * | 3/2016 | Mao | A63F 13/825 |
| | | | 345/633 |

* cited by examiner

*Primary Examiner* — Said Broome
(74) *Attorney, Agent, or Firm* — Dentons US LLP

(57) ABSTRACT

The present disclosure relates generally to for displaying a set of images based on captured image data. In some embodiments, a system displays a first set of images corresponding to a first perspective in a virtual reality (VR) (or mixed reality (MR)) environment. The system receives a request while displaying the first set of images. The system captures image data corresponding to a second perspective in the VR (or MR) environment in response to receiving the request. The system displays a second set of images based on the captured image data.

25 Claims, 12 Drawing Sheets

CAPTURED IMAGE DATA IN A COMPUTER-GENERATED REALITY ENVIRONMENT

CROSS-REFERENCE TO RELATED APPLICATIONS

This application is a continuation of U.S. patent application Ser. No. 16/141,393, entitled "Captured Image Data in a Computer-Generated Reality Environment," filed Sep. 25, 2018, which claims priority to U.S. Provisional Application No. 62/566,221, entitled "Captured Image Data in a Mixed Reality Environment," filed on Sep. 29, 2017, the contents of which are incorporated by reference in their entireties for all purposes.

TECHNICAL FIELD

The present disclosure relates generally to computer-generated reality environments (including virtual reality (VR) and mixed reality (MR) environments), and more specifically to techniques for displaying a set of images based on captured image data.

BACKGROUND

VR systems typically allow a user to view a VR environment from a first-person perspective. However, from the first-person perspective, a user has difficulty perceiving how a user's avatar is being portrayed in the VR environment. In addition, recording the VR environment from the first-person perspective often captures the sudden, jerky movements of the user's head. The recording is thus difficult to watch and can cause motion sickness.

SUMMARY

Described herein are techniques for providing a VR system that enables a user to easily perceive how the user's avatar is being portrayed in the VR environment (or an MR environment). Also described herein are techniques for first-person recordings of the VR (or MR) environment while reducing or eliminating sudden or jerky movements.

In some embodiments, a method is described. The method comprises: displaying, on a display, to a user, a first set of images corresponding to a first perspective in a VR (or MR) environment, wherein the first set of images is based on a first head position of the user; while displaying the first set of images, receiving a request; in response to receiving the request, capturing image data corresponding to a second perspective in the VR (or MR) environment, wherein the captured image data is based on a position of the user; and wherein the first perspective is different from the second perspective; displaying, on the display, a second set of images, wherein the second set of images is based on the captured image data corresponding to the second perspective and is based on a second head position of the user; while displaying the second set of images, detecting, using an orientation sensor, a change in head position of the user from the second head position to a third head position; and displaying, on the display, a third set of images, wherein the third set of images is based on the captured image data corresponding to the second perspective and is based on the third head position of the user.

In some embodiments, a system is described. The system includes: a display; an orientation sensor, one or more processors; and memory storing one or more programs configured to be executed by the one or more processors, the one or more programs including instructions for: displaying, on a display, to a user, a first set of images corresponding to a first perspective in a VR (or MR) environment, wherein the first set of images is based on a first head position of the user; while displaying the first set of images, receiving a request; in response to receiving the request, capturing image data corresponding to a second perspective in the VR (or MR) environment, wherein the captured image data is based on a position of the user; and wherein the first perspective is different from the second perspective; displaying, on the display, a second set of images, wherein the second set of images is based on the captured image data corresponding to the second perspective and is based on a second head position of the user; while displaying the second set of images, detecting, using an orientation sensor, a change in head position of the user from the second head position to a third head position; and displaying, on the display, a third set of images, wherein the third set of images is based on the captured image data corresponding to the second perspective and is based on the third head position of the user.

In some embodiments, a non-transitory computer-readable storage medium is described. The non-transitory computer-readable storage medium storing one or more programs configured to be executed by one or more processors of a system with a display and an orientation sensor, the one or more programs including instructions for: displaying, on a display, to a user, a first set of images corresponding to a first perspective in a VR (or MR) environment, wherein the first set of images is based on a first head position of the user; while displaying the first set of images, receiving a request; in response to receiving the request, capturing image data corresponding to a second perspective in the VR (or MR) environment, wherein the captured image data is based on a position of the user; and wherein the first perspective is different from the second perspective; displaying, on the display, a second set of images, wherein the second set of images is based on the captured image data corresponding to the second perspective and is based on a second head position of the user; while displaying the second set of images, detecting, using an orientation sensor, a change in head position of the user from the second head position to a third head position; and displaying, on the display, a third set of images, wherein the third set of images is based on the captured image data corresponding to the second perspective and is based on the third head position of the user.

In some embodiments, a transitory computer-readable storage medium is described. The transitory computer-readable storage medium storing one or more programs configured to be executed by one or more processors of a system with a display and an orientation sensor, the one or more programs including instructions for: displaying, on a display, to a user, a first set of images corresponding to a first perspective in a VR (or MR) environment, wherein the first set of images is based on a first head position of the user; while displaying the first set of images, receiving a request; in response to receiving the request, capturing image data corresponding to a second perspective in the VR (or MR) environment, wherein the captured image data is based on a position of the user; and wherein the first perspective is different from the second perspective; displaying, on the display, a second set of images, wherein the second set of images is based on the captured image data corresponding to the second perspective and is based on a second head position of the user; while displaying the second set of images, detecting, using an orientation sensor, a change in head position of the user from the second head position to a third head position; and displaying, on the display, a third set of images, wherein the third set of images is based on the captured image data corresponding to the second perspective and is based on the third head position of the user.

BRIEF DESCRIPTION OF THE FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

DETAILED DESCRIPTION

Figure 1A:
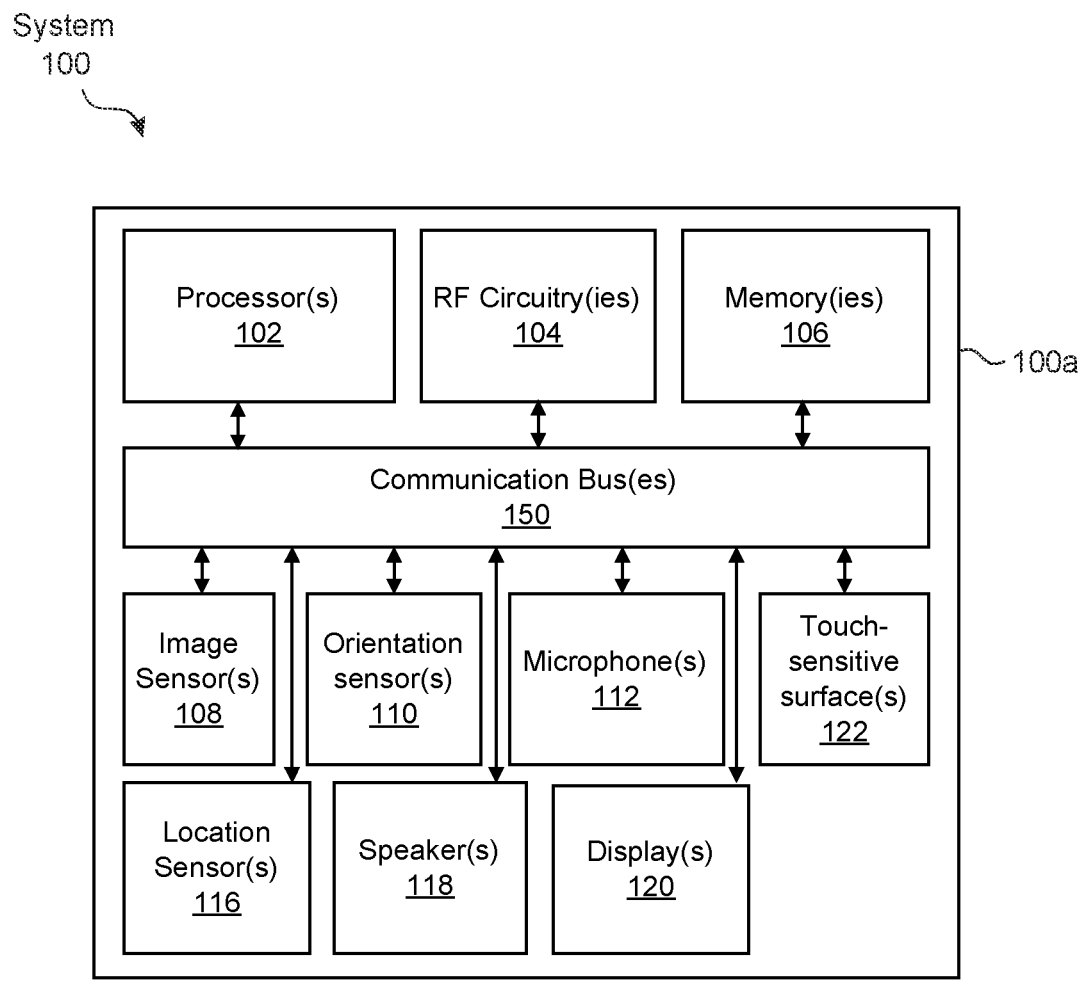
FIGS. 1A-1B depict exemplary systems for use in various computer-generated reality technologies, including virtual reality and mixed reality.

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual Objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
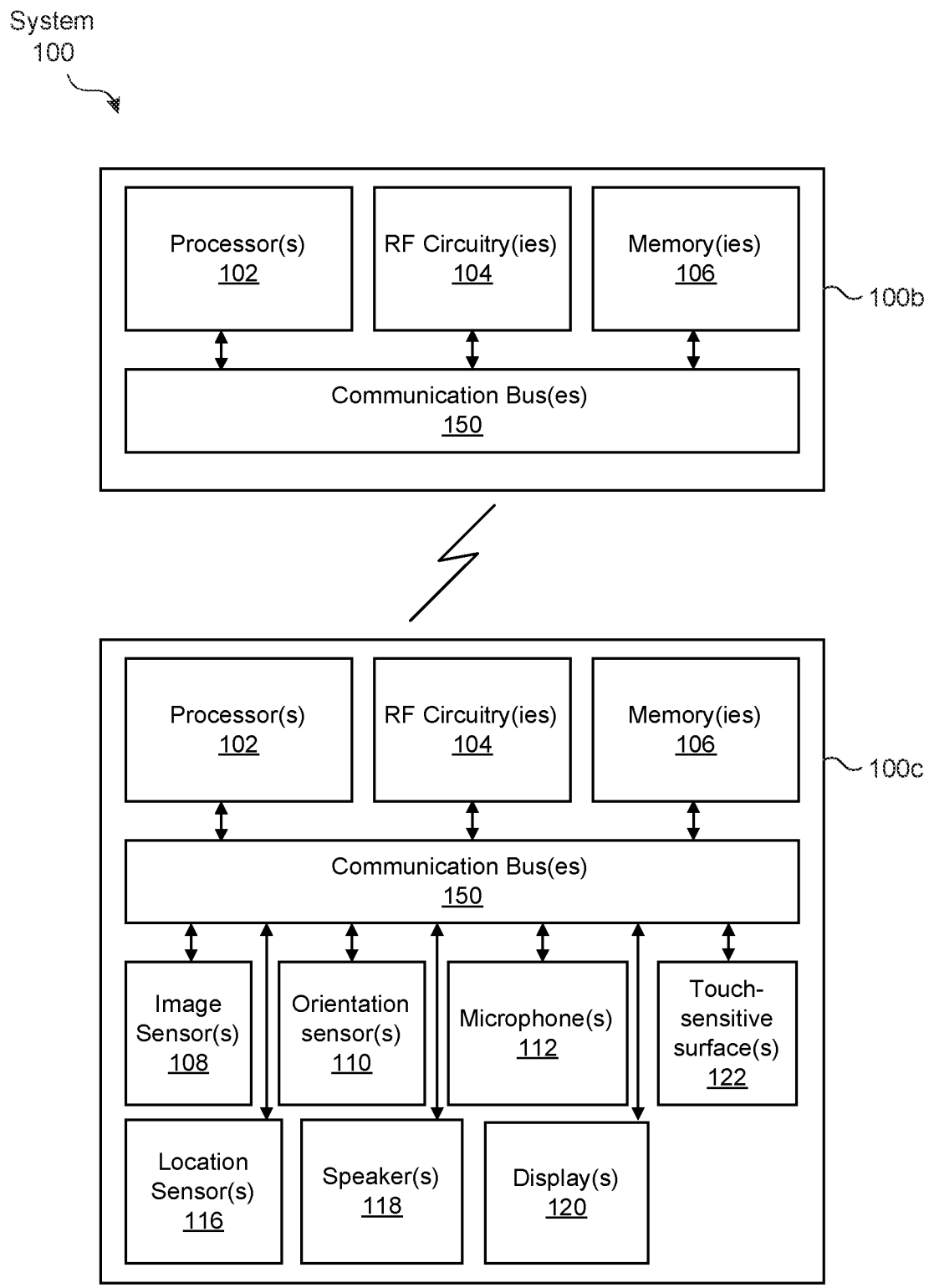

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 1C:
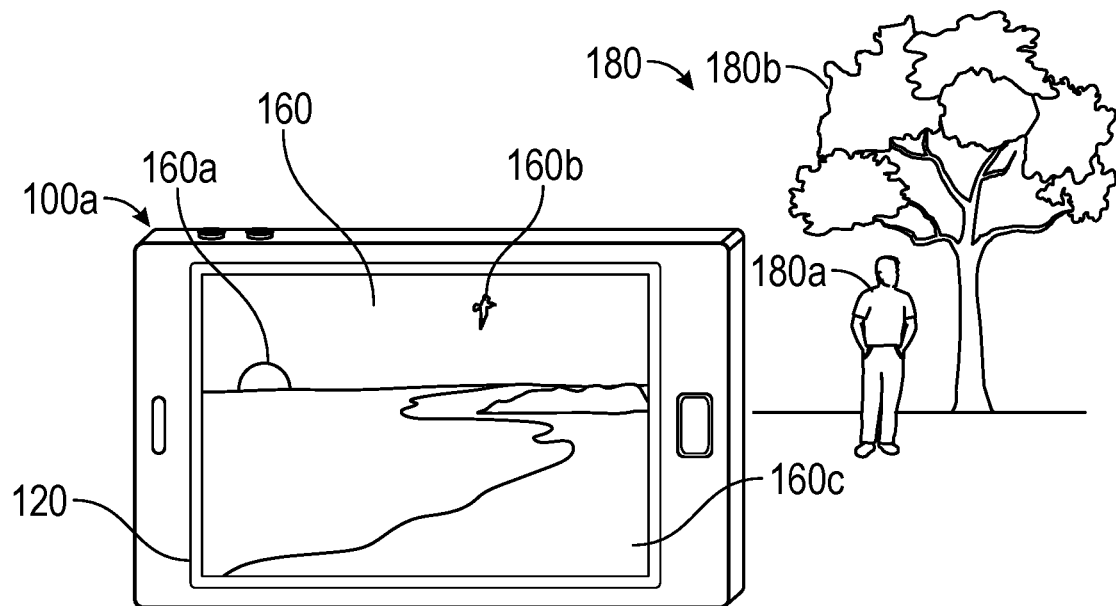
FIGS. 1C-1E illustrate examples of the system in the form of mobile devices.
Figure 1D:
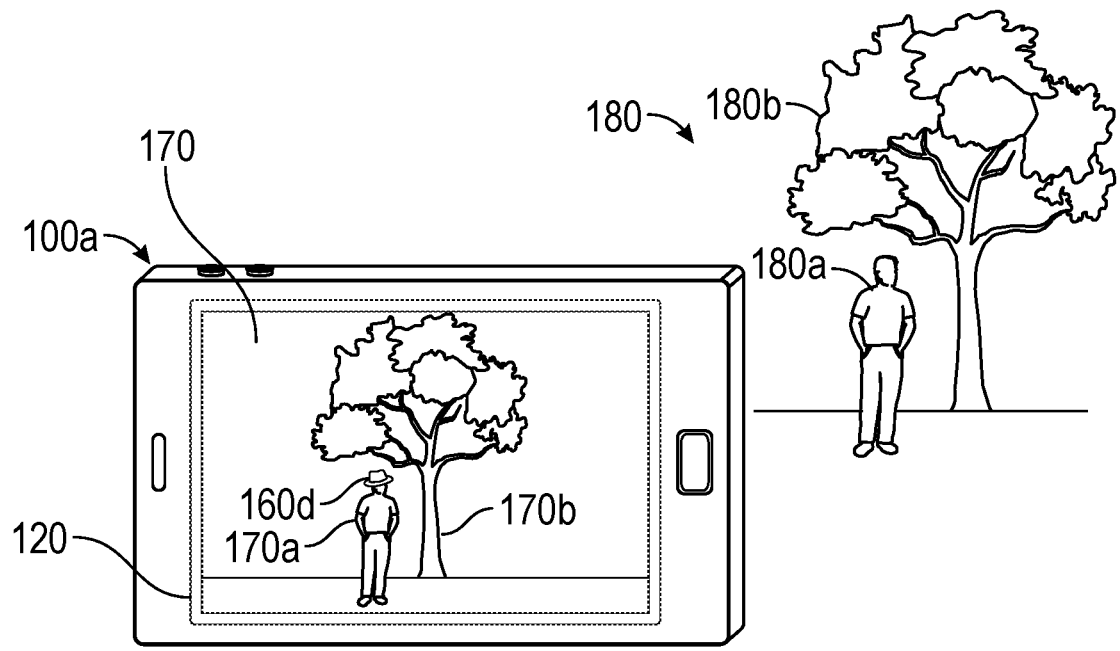
Figure 1E:
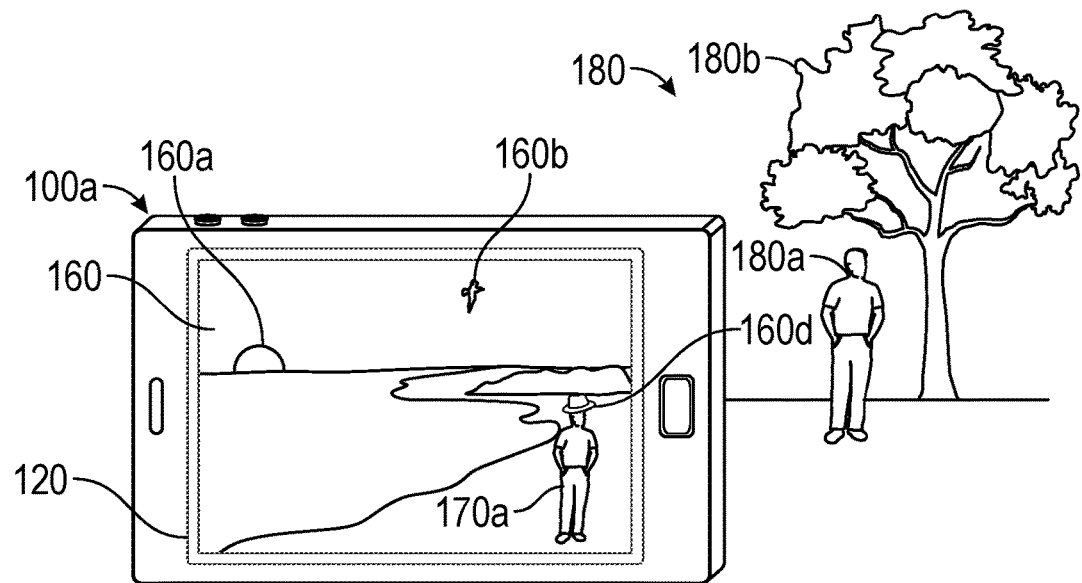

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. 1I.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100a. In FIGS. 1C-1E, device 100a is a mobile device, such as a cellular phone. FIG. 1C illustrates device 100a carrying out a virtual reality technique. Device 100a is displaying, on display 120, a virtual environment 160 that includes virtual objects, such as sun 160a, birds 160b, and beach 160c. Both the displayed virtual environment 160 and virtual objects (e.g., 160a, 160b, 160c) of the virtual environment 160 are computer-generated imagery. Note that the virtual reality environment depicted in FIG. 1C does not include representations of physical objects from the real environment 180, such as physical person 180a and physical tree 180b, even though these elements of real environment 180 are within the field of view of image sensor(s) 108 of device 100a.

FIG. 1D illustrates device 100a carrying out a mixed reality technique, and in particular an augmented reality technique, using pass-through video. Device 100a is displaying, on display 120, a representation 170 of the real environment 180 with virtual objects. The representation 170 of the real environment 180 includes representation 170a of person 180a and representation 170b of tree 180b. For example, the device uses image sensor(s) 108 to capture images of the real environment 180 that are passed through for display on display 120. Device 100a overlays hat 160d, which is a virtual object generated by device 100a, on the head of the representation 170a of person 180a. Device 100a tracks the location and/or orientation of physical objects with respect to the position and/or orientation of device 100a to enable virtual objects to interact with physical objects from the real environment in the augmented reality environment. In this example, device 100a accounts for movements of device 100a and person 180a to display hat 160d as being on the head of the representation 170a of person 180a, even as device 100a and person 180a move relative to one another.

FIG. 1E illustrates device 100a carrying out a mixed reality technique, and in particular an augmented virtuality technique. Device 100a is displaying, on display 120, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a in real environment 180. Device 100a places representation 170a of person 180a in virtual environment 160 for display on display 120. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a. Notably, in this example, device 100a does not display a representation of tree 180b even though tree 180b is also within the field of view of the image sensor(s) of device 100a, in carrying out the mixed reality technique.

Figure 1F:
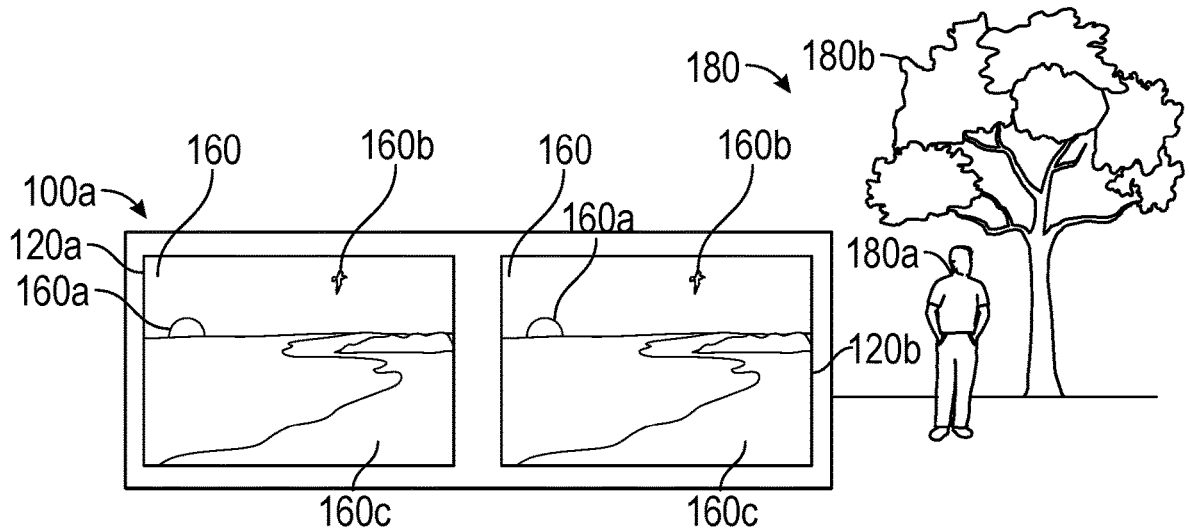
FIGS. 1F-1H illustrate examples of the system in the form of head-mounted display devices.
Figure 1G:
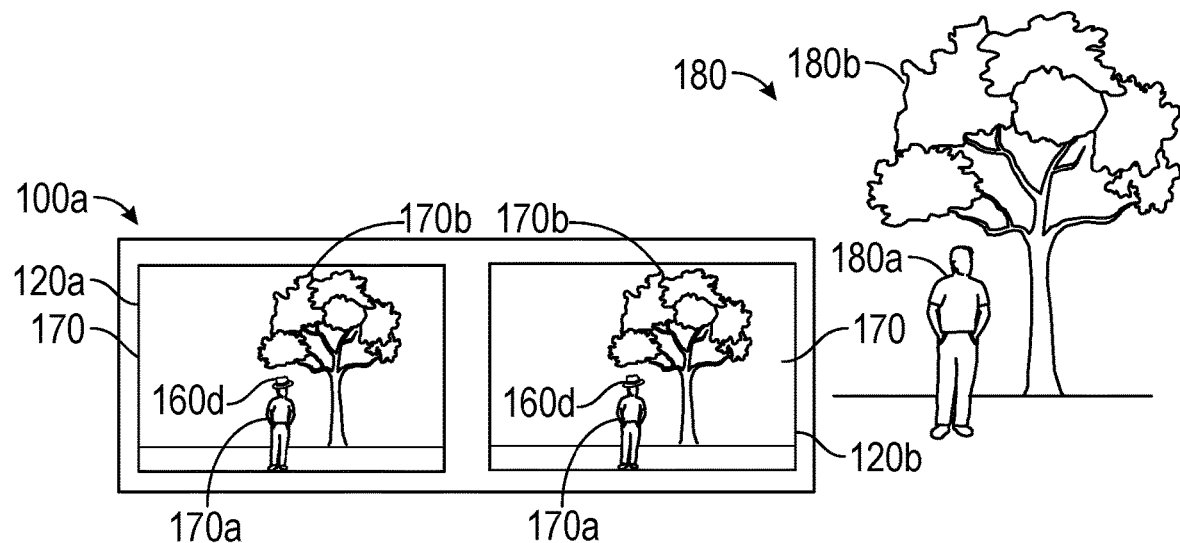
Figure 1H:
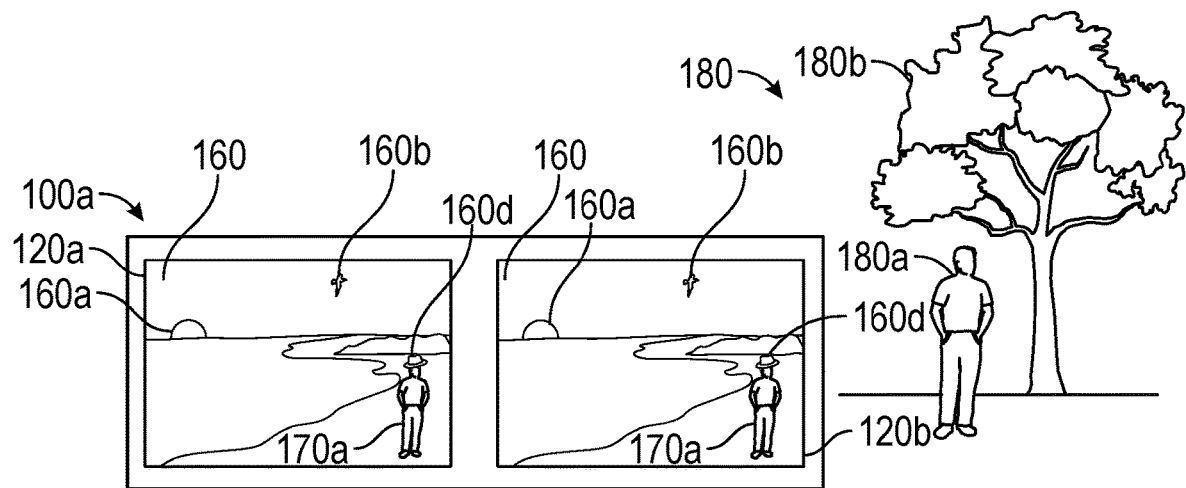

FIGS. 1F-1H illustrate examples of system 100 in the form of device 100a. In FIGS. 1F-1H, device 100a is a HMD device configured to be worn on the head of a user, with each eye of the user viewing a respective display 120a and 120b. FIG. 1F illustrates device 100a carrying out a virtual reality technique. Device 100a is displaying, on displays 120a and 120b, a virtual environment 160 that includes virtual objects, such as sun 160a, birds 160b, and beach 160c. The displayed virtual environment 160 and virtual objects (e.g., 160a, 160b, 160c) are computer-generated imagery. In this example, device 100a simultaneously displays corresponding images on display 120a and display 120b. The corresponding images include the same virtual environment 160 and virtual objects (e.g., 160a, 160b, 160c) from different viewpoints, resulting in a parallax effect that provides a user with the illusion of depth of the objects on the displays. Note that the virtual reality environment depicted in FIG. 1F does not include representations of physical objects from the real environment, such as person 180a and tree 180b even though person 180a and tree 180b are within the field of view of the image sensor(s) of device 100a, in carrying out the virtual reality technique.

FIG. 1G illustrates device 100a carrying out an augmented reality technique using pass-through video. Device 100a is displaying, on displays 120a and 120b, a representation 170 of real environment 180 with virtual objects. The representation 170 of real environment 180 includes representation 170a of person 180a and representation 170b of tree 180b. For example, device 100a uses image sensor(s) 108 to capture images of the real environment 180 that are passed through for display on displays 120a and 120b. Device 100a is overlaying a computer-generated hat 160d (a virtual object) on the head of representation 170a of person 180a for display on each of displays 120a and 120b. Device 100a tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

Figure 1I:
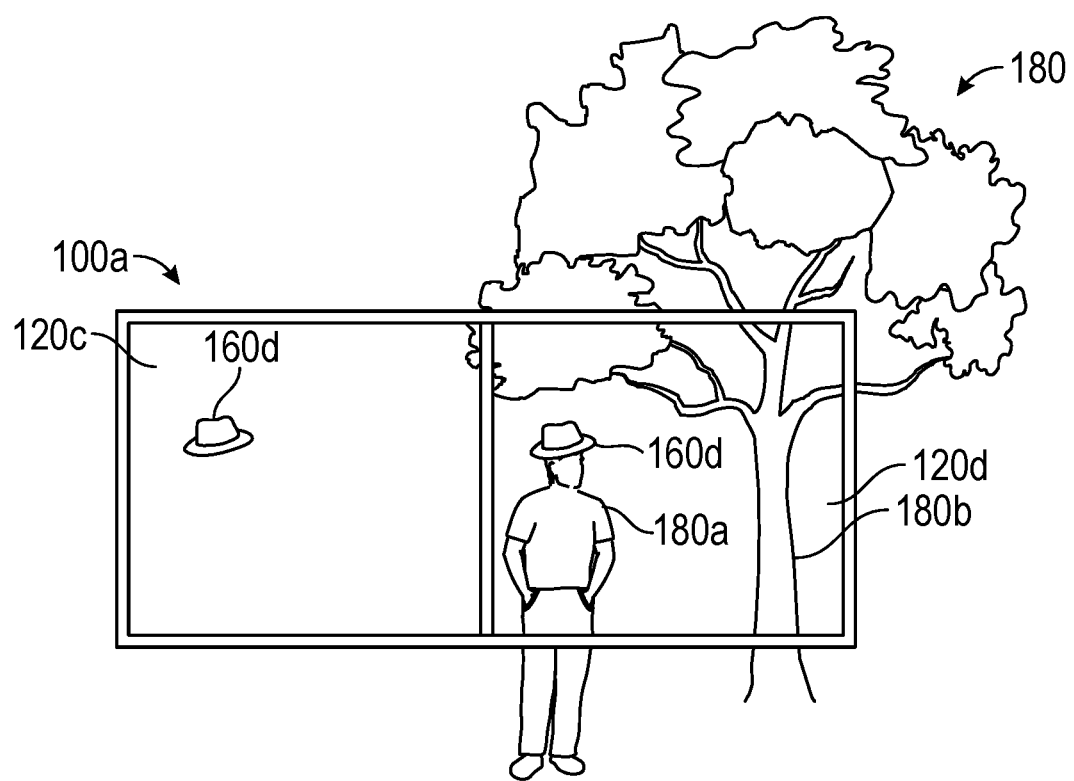
FIG. 1I illustrates an example of the system in the form of a head-up display device.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
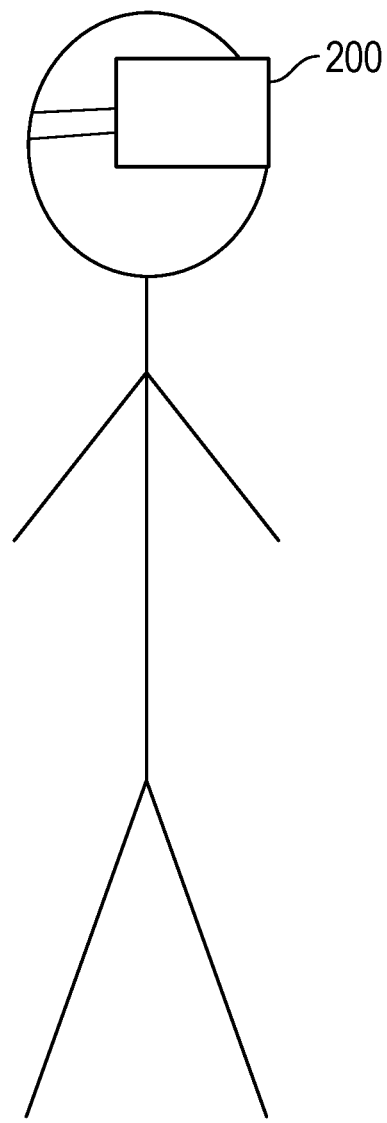
FIG. 2 illustrates a user wearing an exemplary VR headset.

FIG. 2 illustrates a user wearing exemplary VR headset 200. VR headset 200 can itself be an embodiment of system 100, or can be an embodiment of a portion of system 100. System 100 is configured to display, on display 102, images of a VR environment for the user to view. In some embodiments, system 100 detects orientation and/or movement of display 102. In some embodiments, display 102 is a user-wearable device (e.g., mounted to the head of the user). The displayed images of the VR environment are based on the head position of the user (and therefore the position of display 102).

Figure 3:
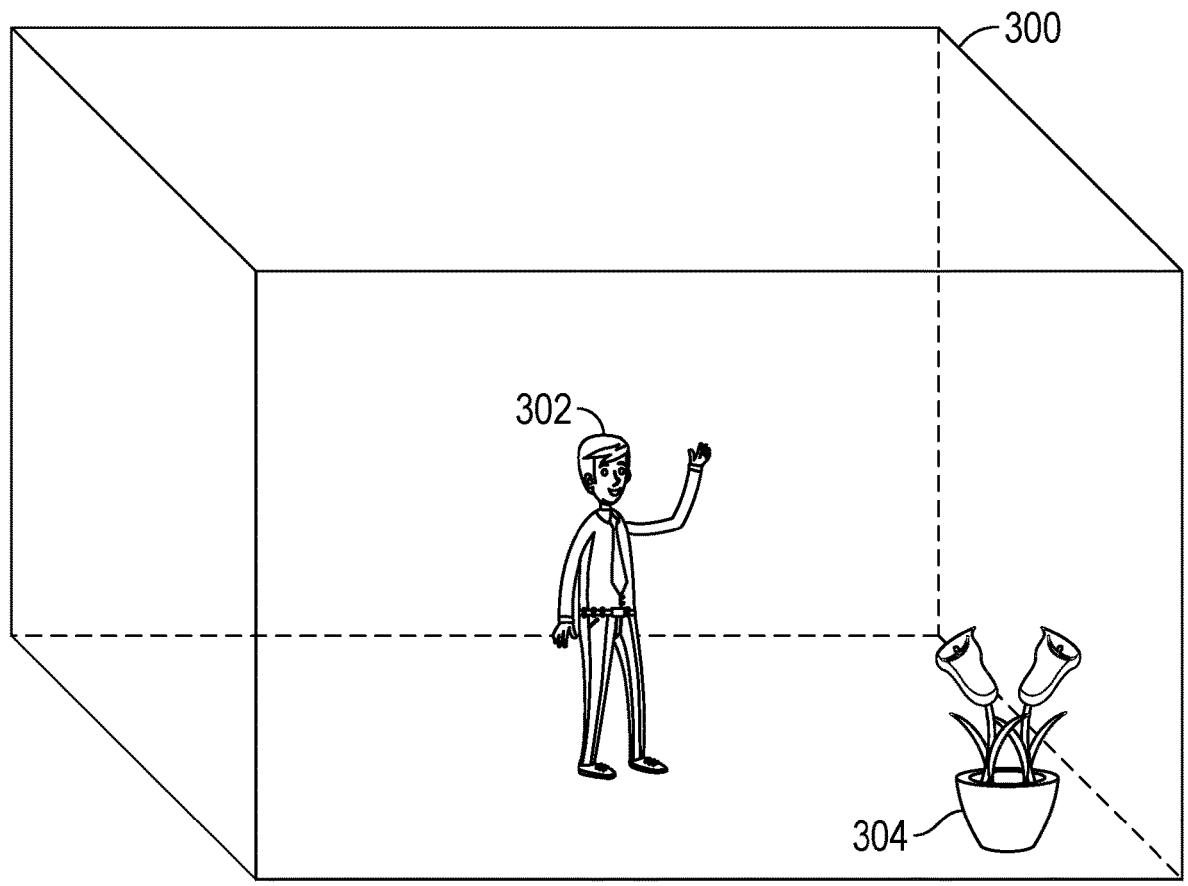
FIG. 3 illustrates an example of a VR environment, a user avatar, and a virtual object.

FIG. 3 illustrates an example of VR environment 300, avatar 302 (e.g., a virtual representation of a user), and virtual object 304. The user can optionally navigate VR environment 300, look around VR environment 300, and modify or move virtual objects in the VR environment 300. In some embodiments, system 100 tracks the user's physical movements (e.g., movement in space, movement of body parts such as raising an arm, movement of head) in the real environment and translates the user's physical movements in the real environment to movements of avatar 302 in VR environment 300.

In some embodiments (e.g., prior to generating (or displaying) virtual camera 400 and virtual selfie stick 402), system 100 receives a request to generate a virtual camera. In response to the request, system 100 generates virtual camera 400 and/or selfie stick 402. In some embodiments, generating virtual camera 400 and/or selfie stick 402 includes displaying virtual camera 400 and/or selfie stick 402, as illustrated in FIG. 4.

In some embodiments, generating the virtual camera 400 and/or selfie stick 402 includes adding the functionality of the respective object (e.g., virtual camera, selfie stick) into the VR environment without updating the VR environment to include visual displays of the respective objects. In some embodiments, after generating virtual camera 400 and/or selfie stick 402, and while the user can manipulate the selfie stick 402 and the virtual camera 400, system 100 optionally is configured to not display virtual camera 400 and/or selfie stick 402 to the user (and, optionally, to other users participating in the VR environment).

Figure 4:
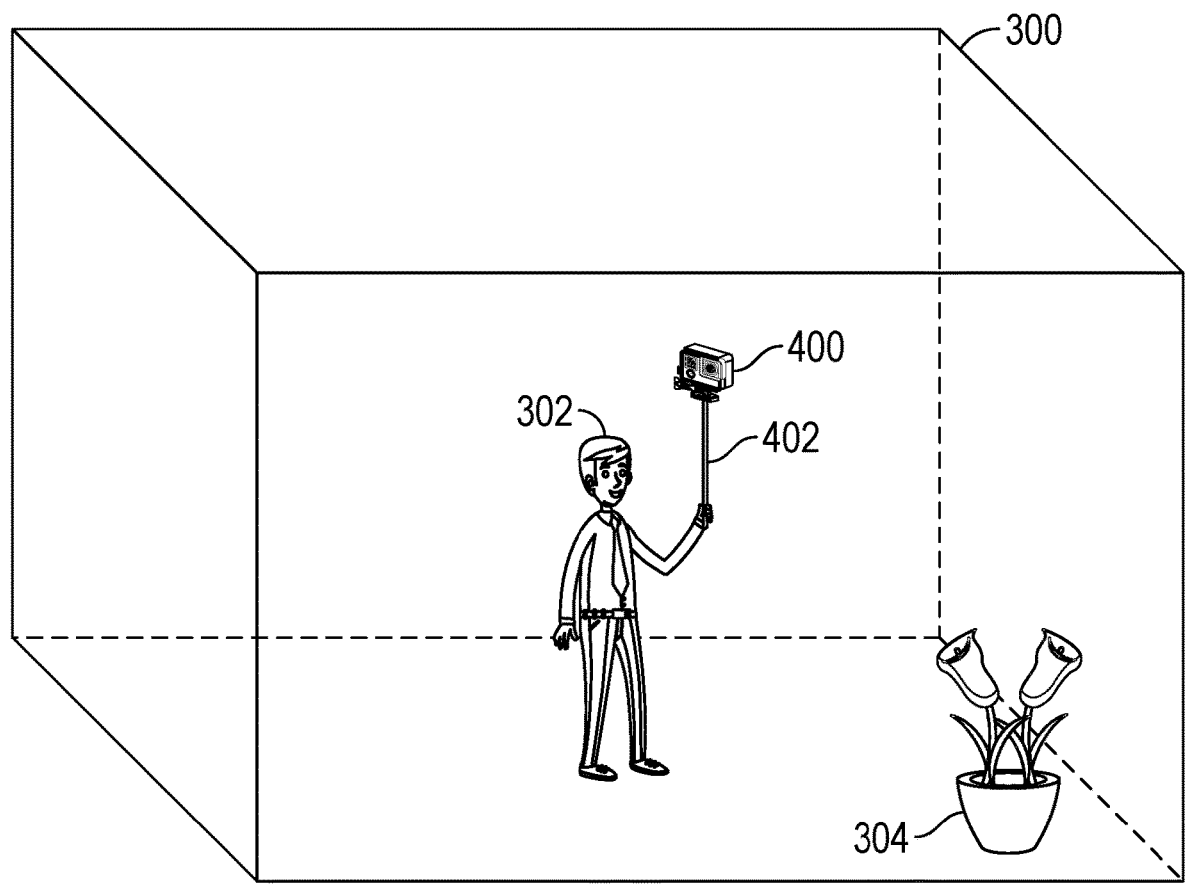
FIG. 4 illustrates an example of a virtual camera and a virtual selfie stick.

FIG. 4 illustrates an example of virtual camera 400 and virtual selfie stick 402. In some embodiments, system 100 displays a first set of images for the user to view that correspond to a first perspective in VR environment 300. In some embodiments, the first perspective is from a perspective corresponding to a first location (e.g., location of the head (or eyes) of avatar 302) in VR environment 300. In some embodiments, the first perspective is a first-person perspective of avatar 302. For the exemplary VR environment illustrated in FIG. 4, system 100 displays a first portion of the VR environment (e.g., selfie stick 402) without displaying a second portion of the VR environment (e.g., virtual object 304). Thus, the user of system 100 sees the VR environment from the first perspective.

Figure 5:
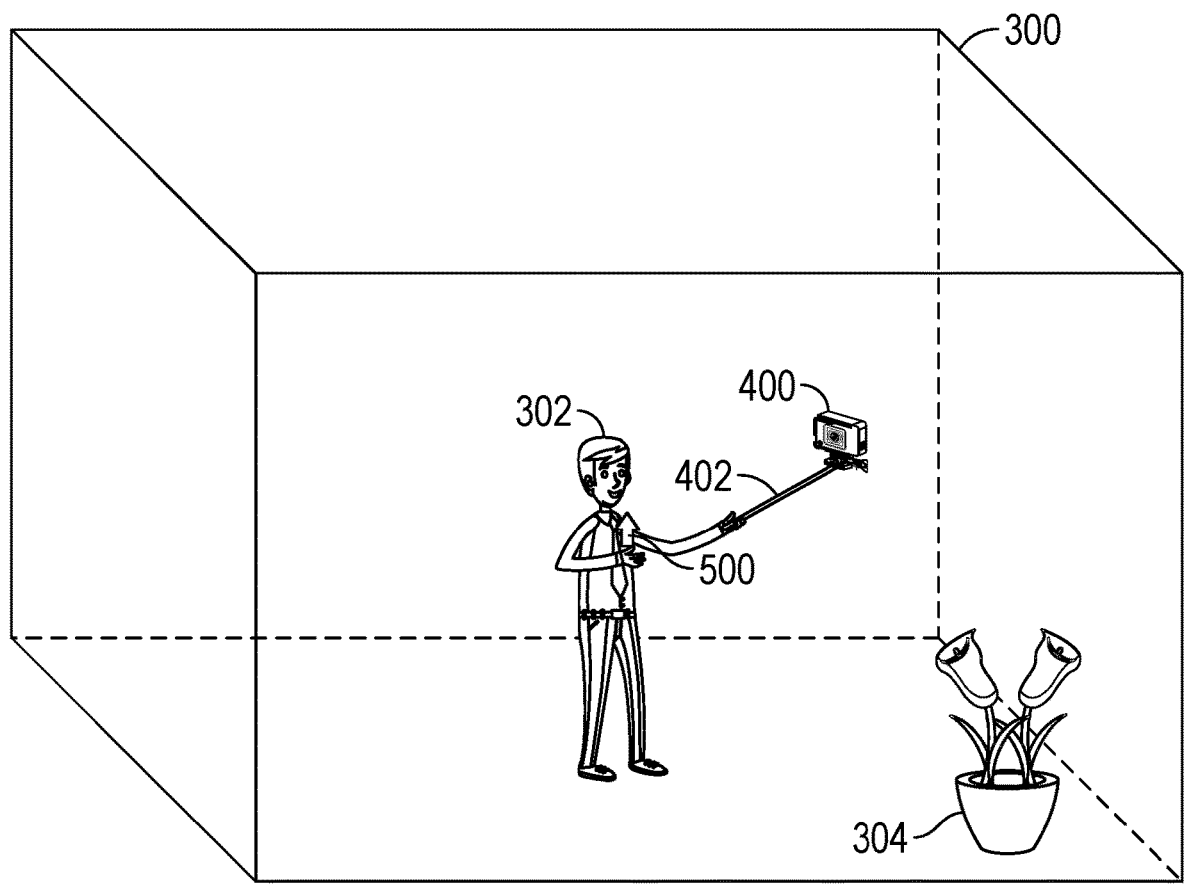
FIG. 5 illustrates an example of positioning the virtual camera and capturing image data.

FIG. 5 illustrates an example of positioning virtual camera 400 and capturing image data. In some embodiments, while system 100 is displaying the VR environment from the first perspective, system 100 receives user input corresponding to a request to locate (or move) virtual camera 400. In some embodiments, the user input corresponding to the request to locate (or move) virtual camera 400 is a gesture of the user performed in the real environment. In response to receiving the user input corresponding to the request to locate (or move) virtual camera 400, system 100 positions virtual camera 400 at a location corresponding to a second perspective in VR environment 300 that is different from the first perspective. In some embodiments, the second perspective is from a perspective corresponding to a second location in VR environment 300. In some embodiments, as illustrated in FIG. 5, the first location is different from the second location. In some embodiments, the first location corresponds to or is the same as the second location. For example, the second location is located at, near, or adjacent to the first location. The virtual camera helps to alleviate sudden, jerky movements typically associated with some techniques for recordings of a VR environment. For example, first-person recordings are usually from the perspective of an avatar's head and often capture the jerky movements detected by the system of the user's head in the real environment. The virtual camera helps to eliminates the jerky movements, but yet captures the first-person perspective by capturing image data corresponding to a location that is, optionally, at, near, or adjacent to the avatar's head in the VR environment.

In some embodiments, the positioning of virtual camera 400 occurs automatically without user input. In some embodiments, the positioning of virtual camera 400 is based on user input (e.g., movement, gesture, voice). In some embodiments, system 100 detects, using input sensor(s) 108, movement of the user (e.g., while system 100 is displaying the VR environment from the first perspective). In response to detecting movement of the user, system 100 positions (or updates the location) of virtual camera 400 in VR environment 300 based on the movement and/or position of the user (e.g., while system 100 continues to display the VR environment from the first perspective).

In some embodiments, system 100 receives a request to capture image data. In some embodiments, prior to receiving the request to capture image data, system 100 is not capturing image data. In some embodiments, the captured image data corresponds to a single image (e.g., a point in time or a single frame). In some embodiments, the captured image data corresponds to video (e.g., a period of time or a plurality of frames). In some embodiments, system 100 receives the request to capture image data while displaying a first set of images to the user (e.g., while system 100 is displaying the VR environment from the first perspective).

In response to receiving the request to capture image data, system 100 captures image data corresponding to the second perspective in VR environment 300. In some embodiments, system 100 captures image data corresponding to one or more virtual objects in the VR environment. In some embodiments, the second perspective is from the perspective of virtual camera 400. In some embodiments, the captured image data is based on a position and/or movement of the user (while maintaining the second perspective). In some embodiments, in response to detecting, using input sensor(s) 108, movement of the user (e.g., the raising of the user's hand), system 100 generates and/or displays movement of avatar 302. For example, system 100 displays the raising of the avatar's hand that corresponds to the user's hand, as illustrated by movement 500. The arrow depicting movement 500 is not a part of the VR environment and is illustrated for the reader's understanding. In this example, the captured image data captures the movement of the avatar's hand in the VR environment, which is based on the movement of the user's hand in the real environment.

In some embodiments, in response to receiving the request to capture image data, system 100 captures image data corresponding to the second perspective in an MR environment. In some embodiments, system 100 captures image data corresponding to one or more virtual objects in the virtual environment and/or captures, using image sensor(s) 108, image data including live images of at least a portion of the real environment. The live images of at least a portion of the real environment match in time to the captured image data corresponding to the one or more virtual objects in the virtual environment. For example, system 100, using image sensor(s) 108, captures live images of a person walking passed the user in the real environment, as the avatar raises their hand (as described above) in the virtual environment. In this example, system 100 captures the timing of the two events (i.e., walking and raising hand) for later playback of the captured image data.

Figure 6:
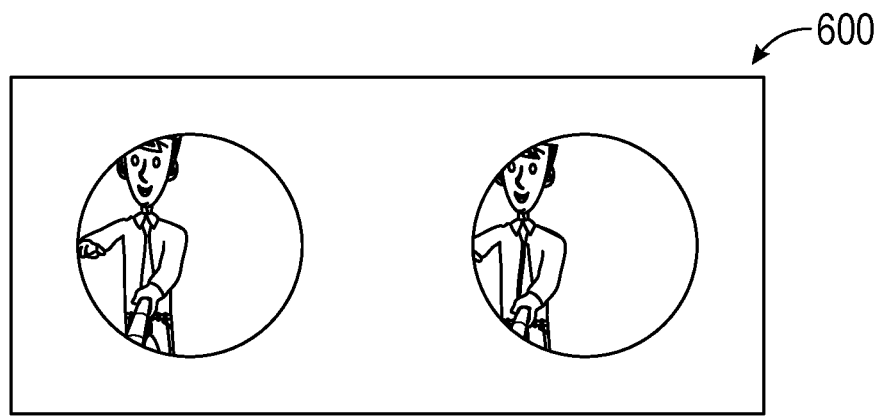
FIG. 6 illustrates an example of displaying a set of images based on captured image data.
Figure 6:
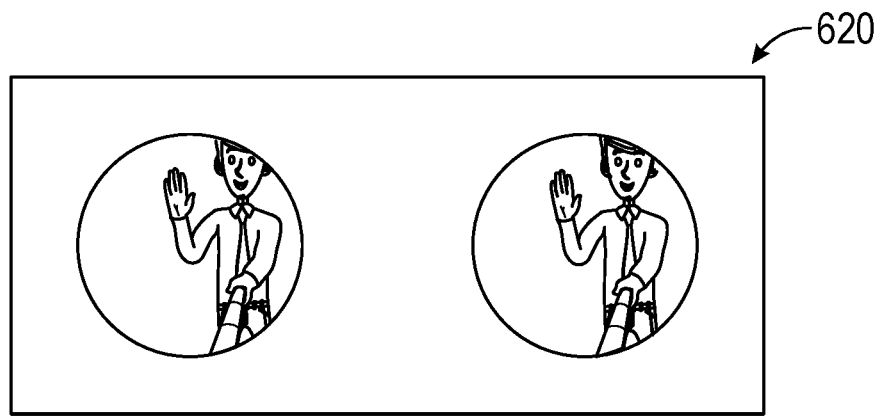
Figure 6:
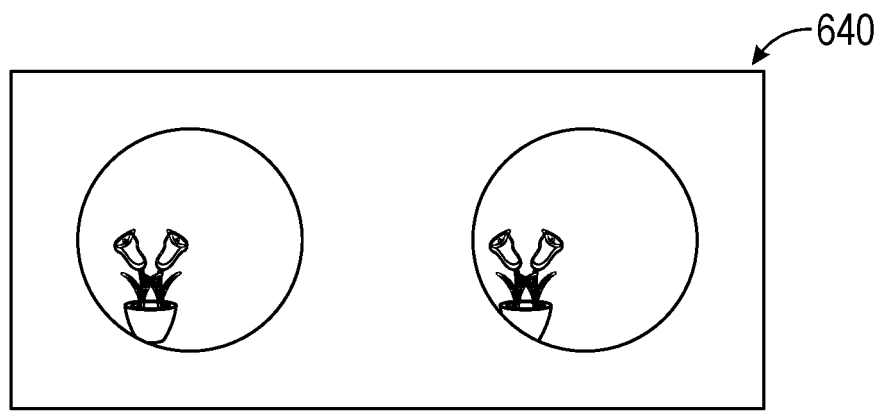

FIG. 6 illustrates an example of system 100 displaying a set of images based on the captured image data. In some embodiments, the captured image data is used to recreate VR environment 300 (or an MR environment). In some embodiments, system 100 receives user input requesting playback of the captured image data and, in response, displays, on the display, VR environment 300 from the second perspective using the captured image data. In some embodiments, as illustrated in view 600, system 100 displays, on display 102, a second set of images. In some embodiments, the second set of images is based on the captured image data corresponding to the second perspective (e.g., from a perspective corresponding to the location of virtual camera 400) and/or is based on a second head position of the user. For example, as illustrated in view 600, the user is looking to the right of avatar 302, and the right hand of avatar 302 has not been raised yet. The second set of images enable a user to easily perceive how the user's avatar is being portrayed in the VR environment.

In some embodiments, system 100 detects, using orientation sensor(s) 110, a change in head position of the user from the second head position to a third head position. For example, the user turns her head to the left. In some embodiments, the detection occurs while displaying the second set of images corresponding to the second perspective in VR environment 300.

In some embodiments, as illustrated in view 620, system 100 displays, on display 102, a third set of images. In some embodiments, the third set of images is based on the captured image data corresponding to the second perspective (e.g., from a perspective corresponding to the location of virtual camera 400) and/or is based on a third head position of the user. For example, as illustrated in view 620, the user turns her head to the left such that the user is looking to the left of avatar 302 and the right hand of avatar 302 has been raised. The third set of images enable a user to easily perceive how the user's avatar is being portrayed in the VR environment.

In some embodiments, system 100 detects, using orientation sensor(s) 110, a change in head position of the user from the third head position to a fourth head position. For example, the user further turns her head to the left. In some embodiments, the detection occurs while displaying the third set of images.

In some embodiments, as illustrated in view 640, system 100 displays, on display 102, a fourth set of images. In some embodiments, the fourth set of images is based on the captured image data corresponding to the second perspective (e.g., from a perspective corresponding to the location of virtual camera 400) and/or is based on a fourth head position of the user. For example, as illustrated in view 640, the user further turns her head to the left such that the user sees object 304 but cannot see avatar 302.

Thus, subsequent to capturing the image data, system 100 enables the user to view different aspects of the VR environment 300 from the second perspective (e.g., the perspective of virtual camera 400). Where the image data corresponds to multiple frames of the VR environment captured over time, system 100 displays different portions of VR environment 300 from the second perspective that were captured over time in response to user input (e.g., changes in the user's head position). Where the image data corresponds to a single frame of the VR environment captured at a point in time, system 100 displays different portions of VR environment 300 from the second perspective captured at the point in time in response to user input (e.g., changes in the user's head position). As a result, the user is enabled to view different portions of VR environment 300 from the second perspective based on the captured image data.

In some embodiments, the captured image data further corresponds to the first perspective in VR environment 300. In some embodiments, in response to receiving the request to capture image data, system 100 captures image data corresponding to the first perspective in addition to the second perspective in VR environment 300. In some embodiments, while displaying a set of images based on the captured image data corresponding to the second perspective (e.g., the second, third, and/or fourth sets of images), system 100 concurrently displays, on the display, a related set of images, wherein the related set of images is based on the captured image data corresponding to the first perspective. For example, in addition to displaying the set of images in view 600 in FIG. 6, system 100 concurrently displays a related set of images based on the captured image data corresponding to a first-person perspective of avatar 302. In some embodiments, system 100 concurrently displays the sets of images using picture in picture, where one set of images (e.g., related set of images) is displayed in an inset window within another set of images (e.g., second set of images). In some embodiments, the sets of images correspond to the same point in time.

Figure 7:
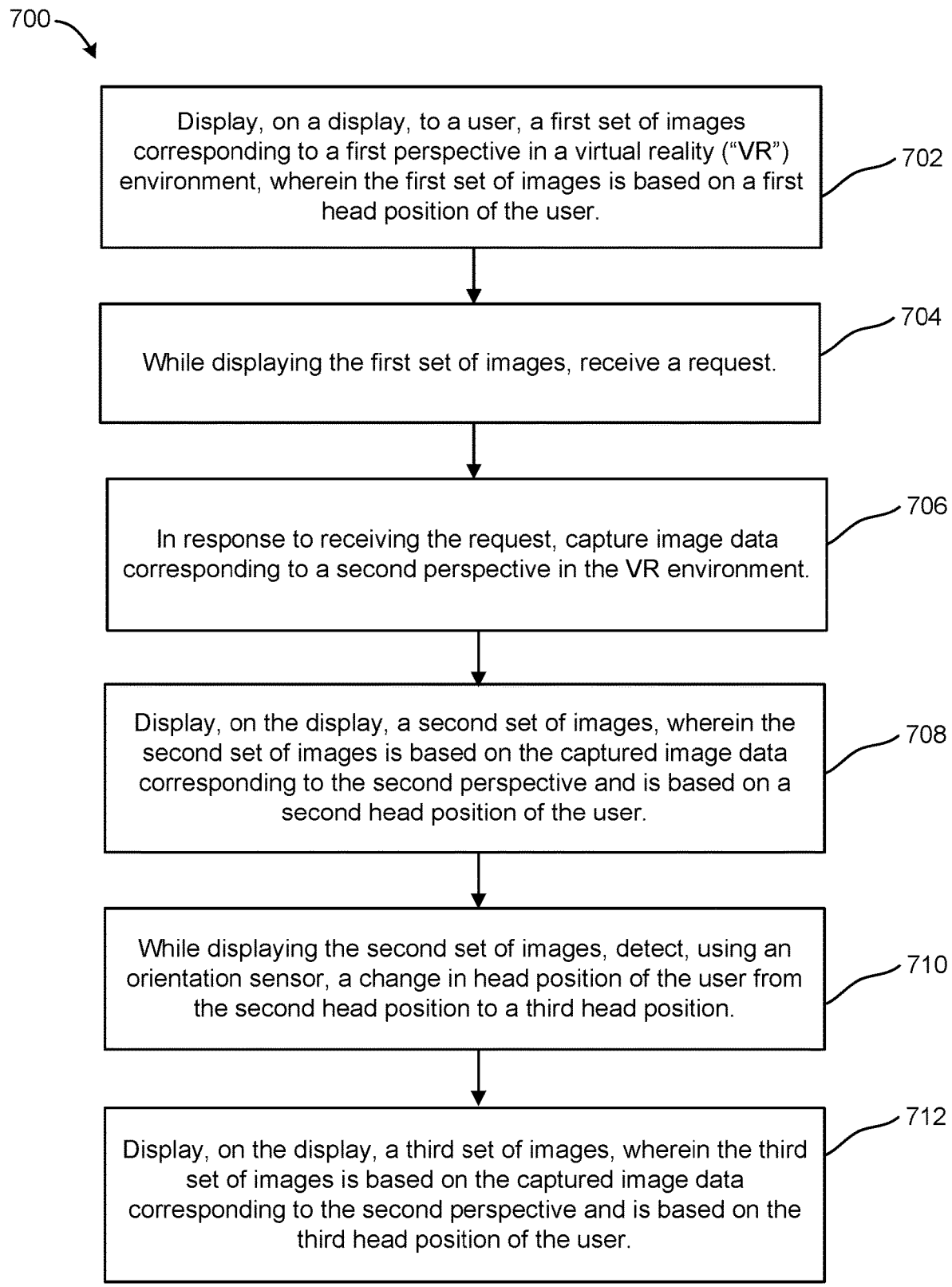
FIG. 7 is a flow diagram illustrating an exemplary method for displaying a set of images based on captured image data.

FIG. 7 is a flow diagram illustrating an exemplary method for displaying a set of images based on captured image data. In some embodiments, the method is performed by system 100.

At block 702, the system (e.g., 100) displays, on a display (e.g., 102), to a user, a first set of images (e.g., displays a virtual environment on a VR headset) corresponding to a first perspective (e.g., from a perspective of a first location in virtual space) in a VR environment (e.g., 300) (or MR environment). The first set of images is based on a first head position of the user.

At block 704, the system (e.g., 100) receives a request while displaying the first set of images. In some embodiments, the request is a request to capture an image or video.

At block 706, in response to receiving the request, the system (e.g., 100) captures image data (e.g., image data, video data, to be used for recreating the environment) corresponding to a second perspective in the VR environment (e.g., 300) (or MR environment). The captured image data is based on a position of the user (e.g., the data is based on a user's hand position, such as a hand of the user controlling a selfie stick (e.g., 402)). In some embodiments, the image data captures a movement of an avatar representing the user. For example, the system (e.g., 100) detects movement of the user's hand in the real environment, which is translated into movement of the avatar's hand in the VR environment (e.g., 300) (or MR environment). In some embodiments, the first perspective is different from the second perspective. In other embodiments, the first perspective is the same as the second perspective. In some embodiments, prior to receiving the request, the system (e.g., 100) is not capturing image data (e.g., is not capturing image data from the second perspective). In some embodiments, the system (e.g., 100) receives user input requesting an end to capturing image data.

At block 708, the system (e.g., 100) displays, on the display (e.g., 102), a second set of images, wherein the second set of images is based on the captured image data corresponding to the second perspective and is based on a second head position of the user (e.g., displaying views of the VR environment (e.g., 300) (or MR environment) for the user to view). In some embodiments, the system (e.g., 100) displays the second set of images in response to a request to initiate playback of the captured image data.

At block 710, while displaying the second set of images, the system (e.g., 100) detects, using an orientation sensor (e.g., 110), a change in head position of the user from the second head position to a third head position. For example, system 100 detects the user looking around while the system (e.g., 100) is displaying images of the VR environment (e.g., 300) (or MR environment) from the second perspective.

At block 712, the system (e.g., 100) displays, on the display (e.g., 102), a third set of images, wherein the third set of images is based on the captured image data corresponding to the second perspective and is based on the third head position of the user.

In some embodiments, the display (e.g., 102) is head-mounted. In some embodiments, the captured image data corresponds to a point in time. In some embodiments, the captured image data corresponds to a period of time.

In some embodiments, the system (e.g., 100) positions a virtual camera (e.g., 400) at a location corresponding to the second perspective in the VR environment (e.g., 300) (or MR environment). In some embodiments, the location of the virtual camera (e.g., 400) (in the VR environment (e.g., 300) (or MR environment)) is based on user input. In some embodiments, the positioning of the virtual camera (e.g., 400) occurs automatically without user input.

In some embodiments, the captured image data further corresponds to the first perspective in the VR environment (e.g., 300) (or MR environment). In some embodiments, while displaying the second set of images, the system (e.g., 100) concurrently displays, on the display (e.g., 102), a related set of images, wherein the related set of images is based on the captured image data corresponding to the first perspective.

The foregoing descriptions of specific embodiments, as described with reference to FIGS. 1A-7, have been presented for purposes of illustration and description. They are not intended to be exhaustive or to limit the scope of the claims to the precise forms disclosed, and it should be understood that many modifications and variations are possible in light of the above descriptions.

As described above, one aspect of the present technology is the gathering and use of data available from various sources to enable a user to easily perceive how the user's avatar is being portrayed in addition to providing techniques for first-person recordings of the VR or MR environment while reducing or eliminating sudden or jerky movements. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present captured image data of the user (e.g., the user's avatar). Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of captured image data, the present technology can be configured to allow users to select to "opt in" or "opt out" of participation in the collection of personal information data during registration for services or anytime thereafter. In another example, users can select not to provide certain user-specific data (e.g., user attributes) in the captured image data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, captured image data can be presented to users using preferences based on non-personal information data or a bare minimum amount of personal information, other non-personal information available to the content delivery services, or publicly available information.

What is claimed is:
1. A system, comprising:
   a display;
   an orientation sensor;
   one or more processors; and
   memory storing one or more programs configured to be executed by the one or more processors, the one or more programs including instructions for:
      displaying, on a display, to a user, a first set of images corresponding to a first perspective in a virtual reality (VR) environment, wherein the first set of images is based on a first head position of the user;
      while displaying the first set of images, receiving a request;
      in response to receiving the request, capturing image data corresponding to a second perspective in the VR environment,
         wherein the captured image data is based on a position of the user; and
         wherein the first perspective is different from the second perspective;
      displaying, on the display, a second set of images, wherein the second set of images is based on the captured image data corresponding to the second perspective and is based on a second head position of the user;
      while displaying the second set of images, detecting, using an orientation sensor, a change in head position of the user from the second head position to a third head position; and
      displaying, on the display, a third set of images, wherein the third set of images is based on the captured image data corresponding to the second perspective and is based on the third head position of the user.

2. The system of claim 1, wherein the display is head-mounted.

3. The system of claim 1, wherein the captured image data corresponds to a point in time.

4. The system of claim 1, wherein the captured image data corresponds to a period of time.

5. The system of claim 1, the one or more programs further including instructions for:
positioning a virtual camera at a location corresponding to the second perspective in the VR environment.

6. The system of claim 5, wherein the location of the virtual camera is based on user input.

7. The system of claim 5, wherein the positioning of the virtual camera occurs automatically without user input.

8. The system of claim 1, wherein the captured image data further corresponds to the first perspective in the VR environment, the one or more programs further including instructions for:
while displaying the second set of images, concurrently displaying, on the display, a related set of images, wherein the related set of images is based on the captured image data corresponding to the first perspective.

9. The system of claim 1, the one or more programs further including instructions for:
prior to receiving the request, not capturing image data.

10. A non-transitory computer-readable storage medium storing one or more programs configured to be executed by one or more processors of a system with a display and an orientation sensor, the one or more programs including instructions for:
displaying, on a display, to a user, a first set of images corresponding to a first perspective in a virtual reality (VR) environment, wherein the first set of images is based on a first head position of the user;
while displaying the first set of images, receiving a request;
in response to receiving the request, capturing image data corresponding to a second perspective in the VR environment,
wherein the captured image data is based on a position of the user; and
wherein the first perspective is different from the second perspective;
displaying, on the display, a second set of images, wherein the second set of images is based on the captured image data corresponding to the second perspective and is based on a second head position of the user;
while displaying the second set of images, detecting, using an orientation sensor, a change in head position of the user from the second head position to a third head position; and
displaying, on the display, a third set of images, wherein the third set of images is based on the captured image data corresponding to the second perspective and is based on the third head position of the user.

11. The non-transitory computer-readable storage medium of claim 10, wherein the display is head-mounted.

12. The non-transitory computer-readable storage medium of claim 10, wherein the captured image data corresponds to a point in time.

13. The non-transitory computer-readable storage medium of claim 10, wherein the captured image data corresponds to a period of time.

14. The non-transitory computer-readable storage medium of claim 10, the one or more programs further including instructions for:
positioning a virtual camera at a location corresponding to the second perspective in the VR environment.

15. The non-transitory computer-readable storage medium of claim 14, wherein the location of the virtual camera is based on user input.

16. The non-transitory computer-readable storage medium of claim 14, wherein the positioning of the virtual camera occurs automatically without user input.

17. The non-transitory computer-readable storage medium of claim 10, wherein the captured image data further corresponds to the first perspective in the VR environment, the one or more programs further including instructions for:
while displaying the second set of images, concurrently displaying, on the display, a related set of images, wherein the related set of images is based on the captured image data corresponding to the first perspective.

18. The non-transitory computer-readable storage medium of claim 10, the one or more programs further including instructions for:
prior to receiving the request, not capturing image data.

19. A method for capturing image data in a virtual reality (VR) environment, comprising:
displaying, on a display, to a user, a first set of images corresponding to a first perspective in the VR environment, wherein the first set of images is based on a first head position of the user;
while displaying the first set of images, receiving a request;
in response to receiving the request, capturing image data corresponding to a second perspective in the VR environment,
wherein the captured image data is based on a position of the user; and
wherein the first perspective is different from the second perspective;
displaying, on the display, a second set of images, wherein the second set of images is based on the captured image data corresponding to the second perspective and is based on a second head position of the user;
while displaying the second set of images, detecting, using an orientation sensor, a change in head position of the user from the second head position to a third head position; and
displaying, on the display, a third set of images, wherein the third set of images is based on the captured image data corresponding to the second perspective and is based on the third head position of the user.

20. The method of claim 19, wherein the display is head-mounted.

21. The method of claim 19, further comprising:
positioning a virtual camera at a location corresponding to the second perspective in the VR environment.

22. The method of claim 21, wherein the location of the virtual camera is based on user input.

23. The method of claim 21, wherein the positioning of the virtual camera occurs automatically without user input.

24. The method of claim 19, wherein the captured image data further corresponds to the first perspective in the VR environment, further comprising:
while displaying the second set of images, concurrently displaying, on the display, a related set of images, wherein the related set of images is based on the captured image data corresponding to the first perspective.

25. The method of claim 19, further comprising:
prior to receiving the request, not capturing image data.

* * * * *